(12) United States Patent
Lafont

(10) Patent No.: US 7,997,527 B2
(45) Date of Patent: Aug. 16, 2011

(54) ASSEMBLY FOR AIRCRAFT COMPRISING A WING SYSTEM ELEMENT AS WELL AS AN ATTACHMENT MAST

(75) Inventor: Laurent Lafont, Pechbusque (FR)

(73) Assignee: Airbus Operations SAS, Toulouse (FR)

( * ) Notice: Subject to any disclaimer, the term of this patent is extended or adjusted under 35 U.S.C. 154(b) by 364 days.

(21) Appl. No.: 11/995,110

(22) PCT Filed: Jul. 28, 2006

(86) PCT No.: PCT/EP2006/064782
§ 371 (c)(1),
(2), (4) Date: Jan. 9, 2008

(87) PCT Pub. No.: WO2007/012667
PCT Pub. Date: Feb. 1, 2007

(65) Prior Publication Data
US 2008/0217467 A1 Sep. 11, 2008

(30) Foreign Application Priority Data
Jul. 29, 2005 (FR) ..................... 05 52386

(51) Int. Cl.
*B64C 3/32* (2006.01)
*B64D 27/26* (2006.01)

(52) U.S. Cl. ......................................................... 244/54

(58) Field of Classification Search .................... 244/54; 248/554, 557
See application file for complete search history.

(56) References Cited

U.S. PATENT DOCUMENTS

| 3,831,888 A | 8/1974 | Baker et al. |
| 4,560,122 A | 12/1985 | Parkinson et al. |
| 5,806,792 A * | 9/1998 | Brossier et al. ................. 244/54 |
| 6,095,456 A * | 8/2000 | Powell ............................ 244/54 |
| 6,758,439 B2 * | 7/2004 | Harrison et al. ................ 244/54 |
| 2004/0129832 A1* | 7/2004 | Marche .......................... 244/54 |
| 2005/0151008 A1* | 7/2005 | Machado et al. ............... 244/54 |

FOREIGN PATENT DOCUMENTS

FR 2698068 A1 * 5/1994
RU 1637186 C * 1/1995

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An assembly for an aircraft including a wing element, a suspension pylon, a mechanism of attaching the pylon onto the element, including two forward half-attachments, each including a shackle and configured to resist forces applied along a vertical direction. The shackle is mounted firstly articulated onto a first fitting fixed to a forward spar of the element extending along the direction of the width, and is secondly mounted articulated onto a second fitting fixed to the rigid structure of the pylon. The two shackles are arranged in the same plane parallel to the direction of the width.

13 Claims, 5 Drawing Sheets

ASSEMBLY FOR AIRCRAFT COMPRISING A WING SYSTEM ELEMENT AS WELL AS AN ATTACHMENT MAST

TECHNICAL DOMAIN

This invention relates in general to an assembly for an aircraft comprising a wing element and an engine suspension pylon under said wing element.

Such an assembly may be used for any type of aircraft, for example aircraft with turbo-engines suspended from the wing, such as turbojets or turboprops.

STATE OF PRIOR ART

On existing aircraft, turbo-engines are suspended below the wing by complex mounting devices, also called EMS (Engine Mounting Structure), or suspension pylons. For turbojets, the mounting structure usually used comprise a rigid box structure, in other words formed by the assembly of upper and lower spars connected to each other through a plurality of transverse ribs.

In a known manner, these pylons are designed particularly to transmit static and dynamic forces generated by the turbo-engines such as the weight, thrust or the different dynamic forces, to the wing.

In this respect, in suspension pylons known according to prior art, forces are transmitted between the suspension pylons and the wing through a forward attachment composed of two lateral half-attachments, an aft attachment and an intermediate attachment designed particularly to resist thrust forces generated by the associated turbo-engine To achieve this, the intermediate attachment that will resist thrust forces, also called a spigot attachment, is generally materialised by a ball joint fixed in the aft upper spar of the rigid structure, between the forward attachment and the aft attachment. This very large sized spigot attachment also comprises a pin or a shear pin located under the aircraft wing through an embedment fitting, so as to fit into the above-mentioned spigot attachment.

Furthermore, the two forward engine half-attachments were designed so as to resist forces applied along the vertical direction of the pylon. To achieve this, each is provided with a shackle arranged in a vertical and longitudinal plane, articulated firstly through a first pin onto a first fitting fixed to a forward spar belonging to the wing element, and secondly through a second pin onto a second fitting fixed to the rigid structure. Furthermore, the two forward half-attachments are usually arranged symmetrically about a median vertical and longitudinal plane of the suspension pylon, this plane being parallel to the planes containing the two shackles, also forming a plane of symmetry for the rigid structure of this pylon.

Nevertheless, this very widespread solution has non-negligible disadvantages that will be described below.

Firstly, note that the desire to achieve the symmetry mentioned above between the two half-attachments sometimes makes it necessary to place them far forward from the front spar of the wing element. This constraint is particularly severe for the half-attachment furthest from the aircraft fuselage, and causes problems in introducing forces into the wing box, problems with the layout of the leading edge, and also aerodynamic problems. Consequently, note that the risk of needing to arrange half-attachments very far forward from the forward spar of the wing element is naturally more severe for a wide rigid structure, although increasing the width of this rigid structure is a solution frequently used so that this structure can resist ever-increasing forces due to the increase in power of engines mounted on aircraft.

Furthermore, this symmetry between the two half-attachments also inevitably introduces the presence of a first large longitudinal fitting between the shackle of the first half-attachment furthest from the fuselage and the forward wing spar, this constraint obviously being extremely problematic in terms of global mass of the assembly. Here also, it is observed that the length of this first fitting often needs to increase with the width of the rigid structure, in order to maintain symmetry between the two forward half-attachments.

OBJECT OF THE INVENTION

Therefore, the purpose of the invention is to propose an assembly for an aircraft at least partially overcoming the problems encountered in assemblies according to prior art.

The object of the invention to achieve this is an aircraft assembly comprising a wing element and a suspension pylon for suspending an engine under the wing element, the assembly also comprising means of attaching a rigid pylon structure onto the wing element, these attachment means comprising two forward half-attachments, each being provided with a shackle and designed to resist forces applied along a vertical direction of the suspension pylon, this shackle being mounted firstly articulated through a first pin onto a first fitting fixed to a forward spar forming part of the wing element and extending along the width of this wing element, and secondly mounted articulated through a second pin onto a second fitting fixed to the rigid structure. According to the invention, the two shackles of the two forward half-attachments are arranged in the same plane parallel to the direction of the width.

Therefore in this assembly according to the invention, there is no longer symmetry between the vertical and longitudinal median plane of the pylon between the two forward half-attachments, as was the case in embodiments according to prior art. The fact that the two shackles are located in the same plane parallel to the width direction and therefore parallel to the forward wing spar, advantageously makes it possible for both half-attachments to remain on the inside of the wing and its leading edge, without projecting forwards from the leading edge. Thus, aerodynamic performances can be considerably increased.

Furthermore, with this solution it is possible to bring the shackles closer to the forward spar, therefore very significantly reducing the length of the two fittings inserted between this forward spar and their associated shackle, regardless of the width of the rigid structure of the suspension pylon. Obviously, as a result the global mass of the assembly can be reduced, and resistance of forces significantly improved.

Preferably, the plane in which the two shackles of the forward half-attachments are arranged is also parallel to the vertical direction of the suspension pylon, like the web of the forward spar. This further improves the possibilities of bringing the two shackles closer to this spar, and therefore making the forward half-attachments compact. Therefore, the result is another significant reduction in the global mass of the assembly, and a significant improvement to the resistance of forces.

Preferably, the second fitting of each forward half-attachment is a double-head fitting, with the shackle being located between the two fittings, and the first pin for each forward half-attachment also passing through a second fitting fixed onto the wing element, such that this shackle is located between the first fitting and the secondary fitting.

Also preferably, one of the two forward half-attachments is designed such that its shackle is mounted to be articulated through a third pin, onto the first fitting fixed to the forward spar, so that this forward half-attachment is capable of resisting forces applied along the width direction.

In this case in which the other of the two forward half-attachments is then designed to resist forces applied along the vertical direction only, it would be possible for the attachment means to also comprise an aft attachment designed to resist forces applied along a longitudinal direction of the pylon, along a transverse direction of this pylon as well as along the vertical direction. Alternately, this aft attachment could be designed so as to resist forces applied along the longitudinal direction of the pylon, along the width direction and along the vertical direction.

Consequently in both cases, the attachment means are capable of forming a statically determinate mounting system composed exclusively of the two forward half-attachments and the aft attachment.

Therefore with such a layout, the spigot type intermediate attachment is advantageously eliminated. Note that on recent aircraft turbo-engines, the large dilution ratio required results in an extremely large overall dimension, because increasing the dilution ratio inevitably increases the engine diameter, and also more particularly increases the diameter of its fan casing. Thus, with a ground clearance that is naturally fixed so as to remain acceptable from a safety point of view, the space remaining between the wing and the turbo-engine to hold the suspension pylon and the different attachments is becoming increasingly restricted, while paradoxically the forces to be resisted are becoming increasingly high. This development of turbo-engines has the unfortunate consequence of reducing the vertical dimensions of the suspension pylon, particularly to maintain sufficient space to put the clamping fitting of the intermediate attachment into place, for which large dimensions were necessary in order to resist forces applied along the longitudinal and transverse directions of the turbo-engine.

Therefore it can be understood that eliminating this intermediate spigot type attachment can give a larger space in which the suspension pylon can be located, consequently making it possible to increase the size of the suspension pylon, that can then be better adapted to the high forces that it is designed to resist, and/or enables an increase in the ground clearance by moving the rigid structure as close as possible to the underside of the wing.

Finally, another object of the invention is an aircraft with at least one assembly like the assembly that has just been described.

Other advantages and characteristics of the invention will become clear after reading the detailed non-limitative description given below.

BRIEF DESCRIPTION OF THE DRAWINGS

This description will be made with reference to the appended figures wherein.

DETAILED DESCRIPTION OF PREFERRED EMBODIMENTS

Figure 1:
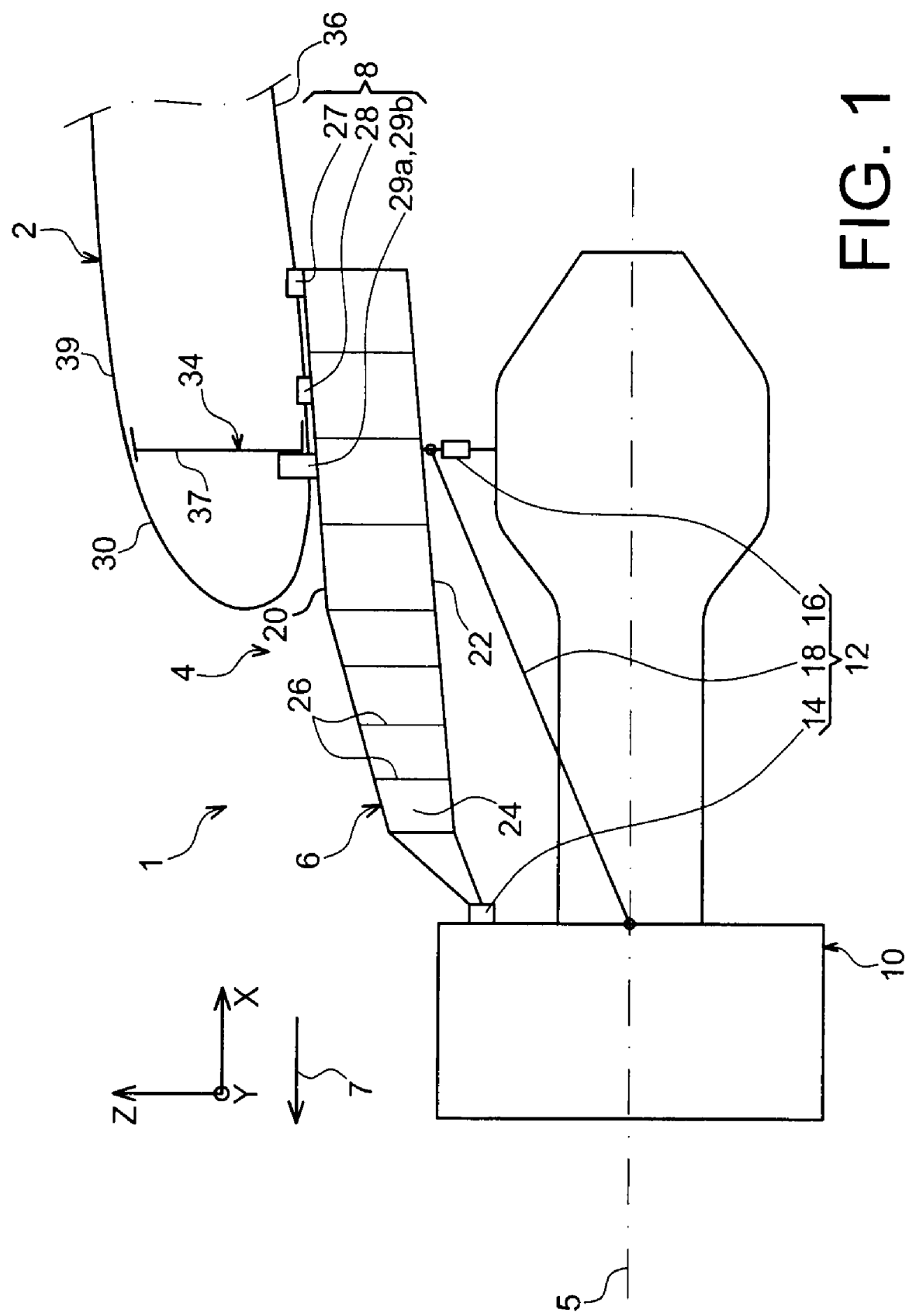
FIG. 1 shows a side view of an aircraft assembly according to a preferred embodiment of this invention.

With reference to FIG. 1, the figure shows an assembly 1 for an aircraft according to a first preferred embodiment of this invention.

Globally, this assembly 1 comprises a wing element 2 such as a wing, a suspension pylon 4 for an engine 10 such as a turbojet, and means 8 of attaching a rigid structure 6 forming the box of the pylon 4 on the wing element 2.

Furthermore, this FIG. 1 also shows attaching means 12 inserted between the rigid structure 6 and the turbo-engine 10 for guidance, these means 12 being composed of one or several forward engine attachments 14, one aft engine attachment 16 and a thrust resistance device 18 provided essentially with lateral resistance rods.

These attaching means 12 do not form part of this invention and consequently will not be described further.

Throughout the following description, by convention X refers to the longitudinal direction of the pylon 4 that is also considered to be the same as the longitudinal direction of the turbojet 10, this X direction being parallel to a longitudinal axis 5 of this turbojet 10. Furthermore, the direction transverse to the pylon 4 is called the Y direction and can also be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbo-engines 10, this direction being shown diagrammatically by the arrow 7.

Still with reference to FIG. 1, it can be seen that only the rigid structure forming the box 6 of the suspension pylon 4 has been shown, with means 8 for attaching this rigid structure under the wing element 2. The other constituents not shown of this pylon 4, such as the secondary structure segregating and holding the systems while supporting aerodynamic fairings, are conventional elements identical to or similar to those used in prior art, and known to those skilled in the art. Consequently, no detailed description of them will be made.

Similarly, note that the rigid structure 6 is similar to the structures encountered in devices according to prior art. Thus, it is effectively of the "box" type, in other words it is formed by the assembly of the upper spar 20 and the lower spar 22 and two side panels 24 (only one being shown due to the side view), these elements 20, 22, 24 being connected to each other through transverse ribs 26 that are normally oriented along parallel YZ planes.

In this embodiment, the attachment means 8 comprise an aft attachment 27 inserted between an aft part of the rigid structure 6 and the intrados 36 of the wing 2, and is designed to resist forces applied along the Y and Z directions, but not forces applied along the X direction. Secondly, the attachment means 8 also include an intermediate attachment 28, for example of the spigot type, inserted between the upper spar 20 of the rigid structure 6 and the intrados 36 of the wing 2, this attachment 28 being designed to resist forces applied along the X and Y directions, but not forces applied along the Z direction. These two attachments 27, 28 are made in a known to those skilled in the art, and therefore they will not be described further.

On the other hand, the attachment means 8 forming a statically determinate mounting system, also comprise two forward half-attachments 29a, 29b specific to this invention and for which a detailed description will be given below, each of these half-attachments 29a, 29b being designed so as to resist forces applied along the Z direction, but not forces applied along the X and Y directions.

With this statically determinate system, forces applied along the X direction are resisted by the intermediate attachment 28, forces applied along the Y direction are resisted jointly by the intermediate attachment 28 and the aft attachment 27, and forces along the Z direction are resisted jointly by means of the two half-attachments 29a, 29b and the aft attachment 27. Furthermore, the moment applied about the X direction is resisted vertically by means of two forward half-attachments 29a, 29b, the moment applied about the Y direction is resisted vertically by means of the two half-attachments 29a, 29b and the aft attachment 27, and the moment applied about the Z direction is resisted transversely by means of the intermediate attachment 28 and the aft attachment 27.

Figure 2:
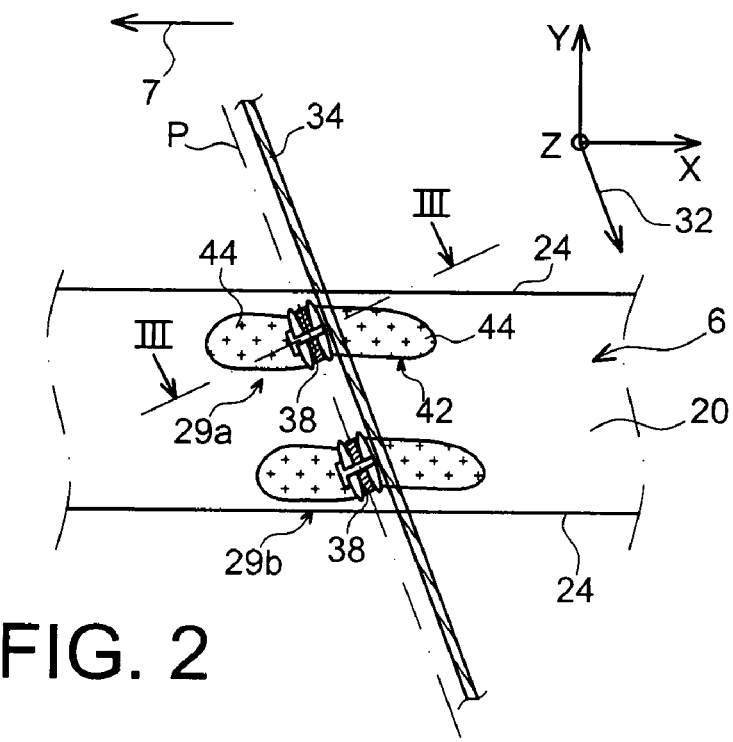
FIG. 2 shows a partial view of the top of the assembly shown in FIG. 1.

With reference to FIG. 2, the figure shows that each of the two forward half-attachments 29a, 29b is fitted with a shackle also called a rod, for example a double shackle in the form of a plate, that is globally connected to the rigid structure 6 and to a forward spar 34 of the wing element 2 (not shown on this figure). Classically, this spar 34 is oriented parallel to the leading edge 30 of the wing 2, namely parallel to a direction 32 of its width, this direction 32 being located in an XY plane and inclined from the X and Y directions.

One of the special features of this invention consists of arranging matters so that the two shackles 38 belonging to the two forward half-attachments 29a, 29b are arranged in the same plane P (represented by a line because the view is a top view), this plane P being parallel to the width direction 32, and preferably parallel to the Z direction. Therefore in such a case, the plane P in which the shackles 38 are arranged is parallel to a plane in which the web 37 (see FIG. 1) of the forward spar 34 is located, which advantageously makes it possible to bring the shackles 38 as close as possible to the web 37. Therefore in general, as can be seen in FIG. 2, the shackles 38 are arranged to be parallel to the spar 34 and close to it.

Figure 3:
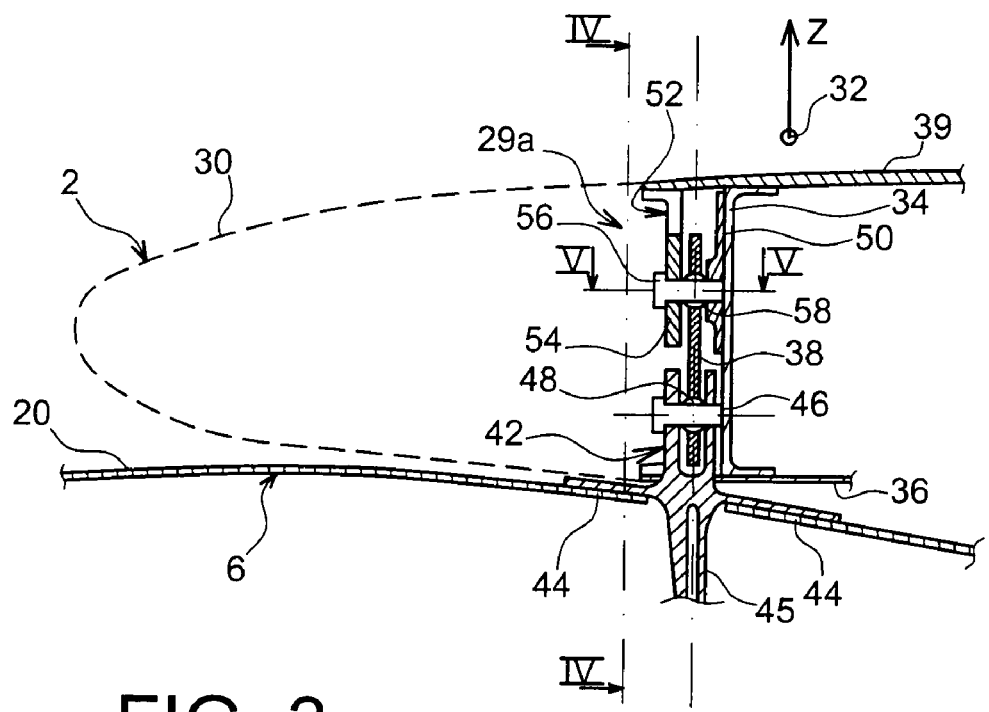
FIG. 3 shows a sectional view taken along line III-III in FIG. 2.
Figure 4:
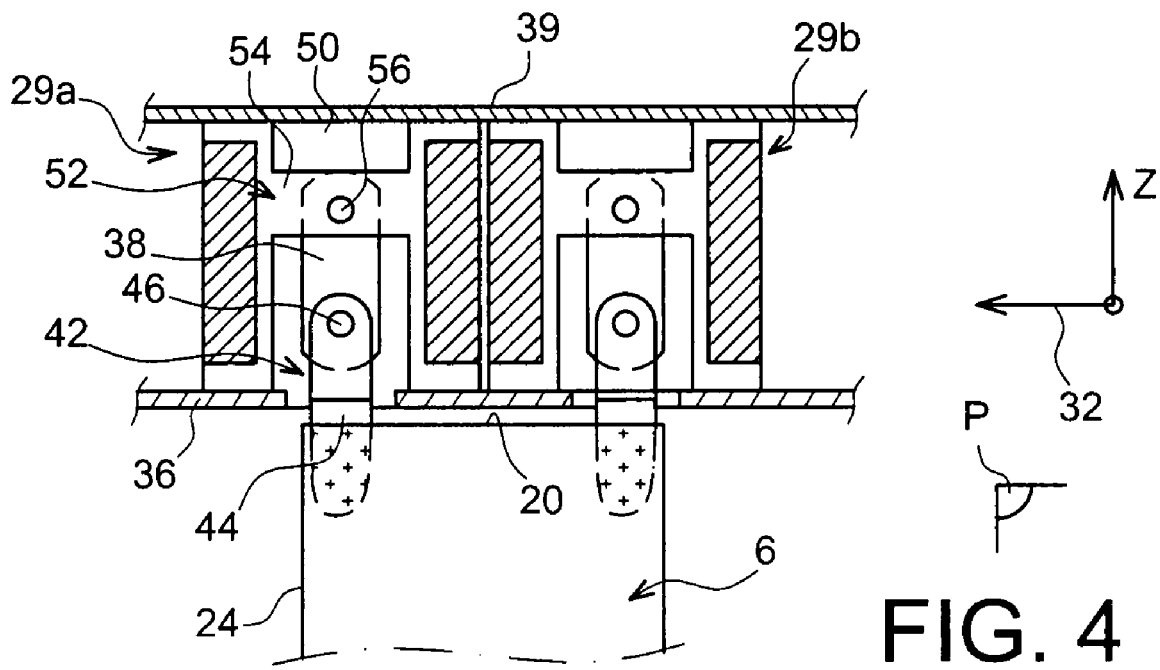
FIG. 4 shows a sectional view taken along line IV-IV in FIG. 3.
Figure 5:
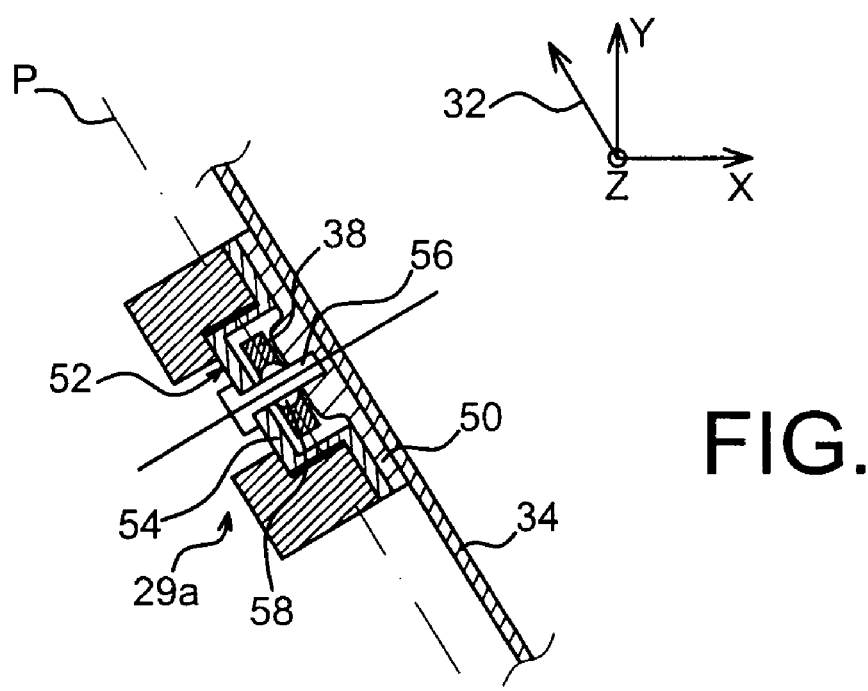
FIG. 5 shows a sectional view taken along line V-V in FIG. 3.

We will now describe the forward half-attachment 29a located the closest to the aircraft fuselage, in this case on the right side, with reference to FIGS. 3 to 5. The other forward half-attachment 29b has an identical design, and consequently will not be described further. Furthermore, these two half-attachments 29a, 29b are arranged symmetrically with respect to a plane orthogonal to plane P.

Therefore with reference to FIGS. 3 to 5, it can be seen that in this preferred embodiment in which the half-attachment 29a is exclusively designed to resist forces along the Z direction, the shackle 38 is in the form of a plate extending along the Z direction and with a small width along the direction 32.

Its lower end is located between the two heads of a second fitting 42 mounted fixed on the upper spar 20 of the rigid structure 6, by means of longitudinal tabs 44 added onto this spar. Moreover, this fitting 42 is preferably mounted on one of the transverse ribs of this box shaped structure, which explains why the lower part 45 of this fitting 42 projects inwards into the box. The two heads of the fitting 42 forming a clevis and passing through the intrados 36 are preferably oriented in planes parallel to the plane P.

A second pin 46 passes through three orifices formed in the forward head of the fitting 42, the lower end of the shackle 38, and the aft head of the fitting 42, in turn one after the other. The pin 46, preferably oriented to be orthogonal to the plane P, thus articulates the shackle 38 on the second fitting 42, preferably associating it with a ball joint 48 housed in the orifice of the shackle 38, and through which this same pin 46 passes.

In extending upwards along the Z direction, the shackle 38 has an upper end located between a first fitting 50 installed fixed on the forward spar 34 of the wing 2, and another, or secondary, fitting 52 installed fixed on this wing. If each of these two fittings separated from each other in the direction orthogonal to the plane P are oriented approximately parallel to this plane P, note that the first fitting 50 matching the shape of the spar 34 is preferably approximately solid, while the other fitting 52 is generally H-shaped with the bar 54 of this H being arranged along the width direction 32. Therefore with this particular layout, the forward head of the second fitting 42 can partially penetrate into the free lower space under the bar of the H, as can be seen better in FIGS. 3 and 4. Obviously, the result is a significant saving in size and mass.

This secondary fitting 52 is then rigidly added onto the wing element 2 firstly being mounted on the extrados 39 of the wing 2 (FIG. 3), and secondly on the first fitting 50 (FIG. 5). A first pin 56 penetrates through the three orifices in the bar 54 of the H of the fitting 52, the upper end of the shackle 38, and the fitting 50, in turn one after the other. The pin 56, preferably oriented to be orthogonal to the plane P, thus articulates the shackle 38 on the first fitting 50, preferably associating it with a ball joint 58 housed in the orifice of the shackle 38, and through which this pin 56 passes.

FIGS. 6 to 9 show part of an assembly according to another preferred embodiment of this invention. In this mode, one of the two forward half-attachments, in this case the half-attachment 29a, is designed to be capable of resisting forces applied along the Z direction and along the width direction 32, the other of the two half-attachments still being designed to resist only forces applied along the Z direction. At the same time, it is also planned to eliminate the intermediate attachment 28 and to modify the aft attachment 27 so that the aft attachment is capable of resisting forces applied along the X, Y and Z directions as shown diagrammatically in FIG. 9.

With this new statically determinate attachment system, forces applied along the X direction are resisted by the aft attachment 27, forces applied along the Y direction are resisted by the aft attachment 27 while forces applied along the width direction 32 are resisted by means of the half-attachment 29a, and forces applied along the Z direction are resisted jointly by means of two forward half-attachments 29a, 29b and the aft attachment 27. Furthermore, the moment applied about the X direction is resisted vertically by means of two forward half-attachments 29a, 29b, the moment applied about the Y direction is resisted vertically by means of the two half-attachments 29a, 29b and the aft attachment 27, and the moment applied about the Z direction is resisted jointly using the forward half-attachment 29a and the aft attachment 27.

To assure that the forward half-attachment 29a can resist the forces applied along the direction 32, a third pin 60 is provided that penetrates into the orifices formed in the bar 54 of the H of the fitting 52, the upper end of the shackle 38 and the fitting 50, respectively. The pin 60, preferably oriented to be orthogonal to the plane P, can thus be used to provide a new articulation between the shackle 38 on the first fitting 50, preferably associating it with a ball joint 62 housed in the orifice of the shackle 38, and through which this same pin 60 passes.

This third pin 60, which is offset from the first pin 56, preferably in the direction 32 only, thus forms a triangular force resistance system with the first and second pins 56, 46 that is quite capable of resisting only forces applied along the Z direction and the direction 32.

Therefore the shackle 38 of this embodiment must extend along the direction 32 so that the third pin 60 can pass through it, which means that it is preferably square or rectangular in shape, but the rectangle is not as long as the rectangle encountered in the embodiment shown in FIGS. 2 to 5. Other elements of the half-attachment 29a presented above are also found in this embodiment, and consequently it should be noted that elements on the figures with the same numbers correspond to identical or similar elements.

This forward half-attachment 29a is provided with a safety fitting 66 practically identical to the second fitting 42 and located close to it, so as to provide a <<Fail Safe>> safety function at this forward half-attachment. The lower end of the shackle 38 is located between the two heads of this fitting 66 mounted fixed on the upper spar 20 of the rigid structure 6, using longitudinal tabs 64 added onto this spar. Moreover, this fitting 66 is also preferably mounted on one of the transverse ribs of this box shaped structure, and its two heads passing through the intrados 36 are oriented along planes parallel to plane P, since they are located in line with the two heads of the second fitting 42, along direction 32.

A fourth pin 68 penetrates into three orifices formed in the forward head of the fitting 66, the lower end of the shackle 38 and the aft head of the fitting 66, in turn one after the other. The pin 68, preferably oriented to be orthogonal to the plane P, thus articulates the shackle 38 on the fitting 66, preferably associating it with a ball joint 70 housed in the orifice of the shackle 38 and through which this same pin 68 passes. Nevertheless, note that this pin 68, also called the <<Fail Safe>> pin, is mounted with radial clearance so that no force passes through it under normal conditions, and such that this pin can form a new force path if one of the other three pins 46, 56, 60 should fail.

Figure 6:
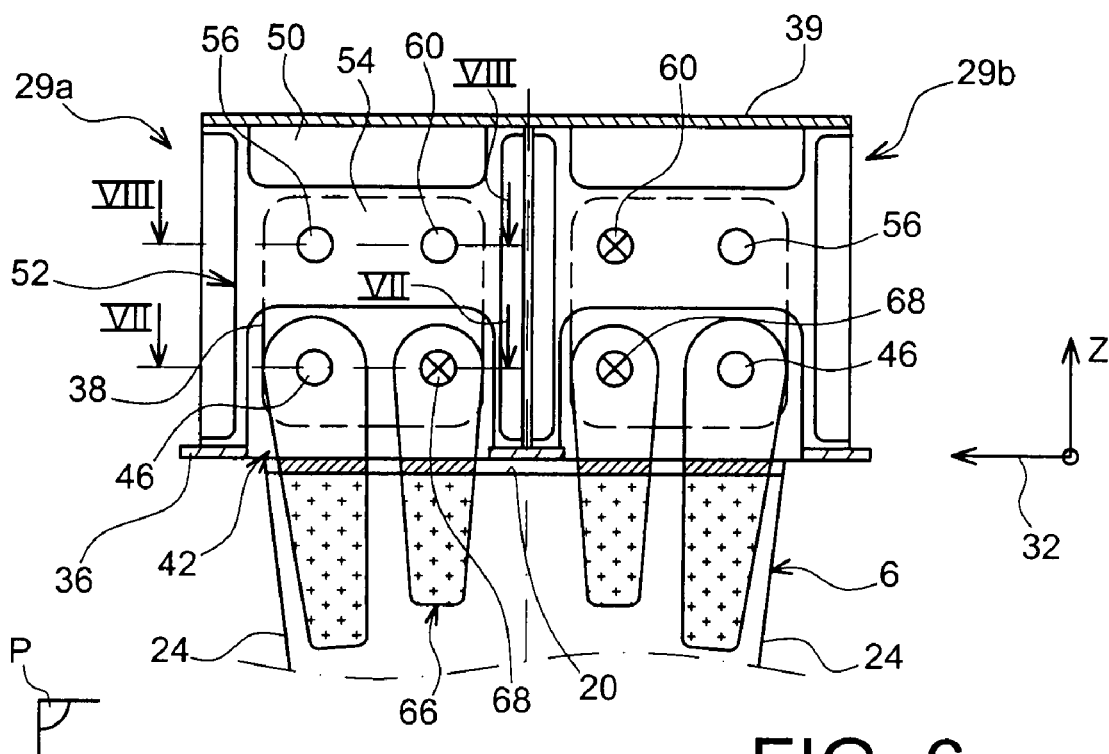
FIG. 6 shows a view similar to that shown in FIG. 4, in which the assembly is in the form of another preferred embodiment of this invention.
Figure 7:
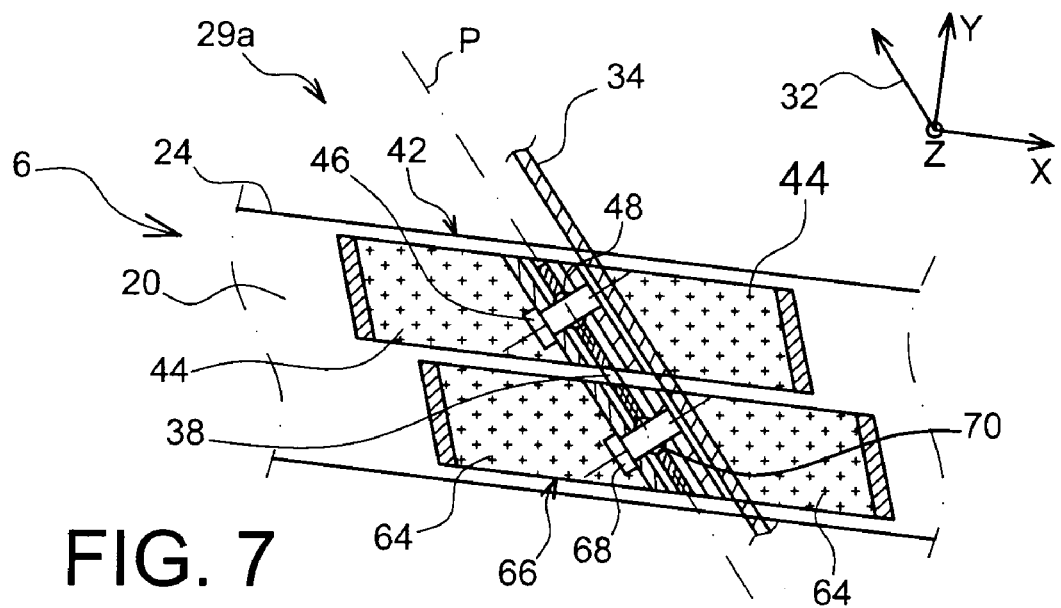
FIG. 7 shows a sectional view taken along line VII-VII in FIG. 6.
Figure 8:
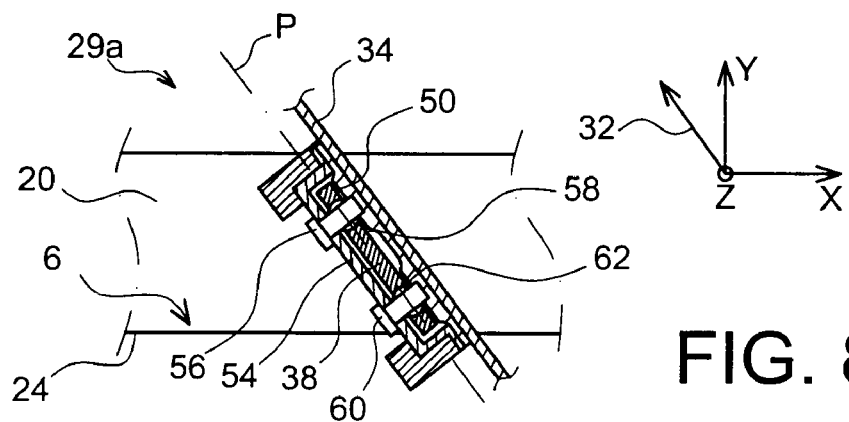
FIG. 8 shows a sectional view taken along line VIII-VIII in FIG. 6.
Figure 9:
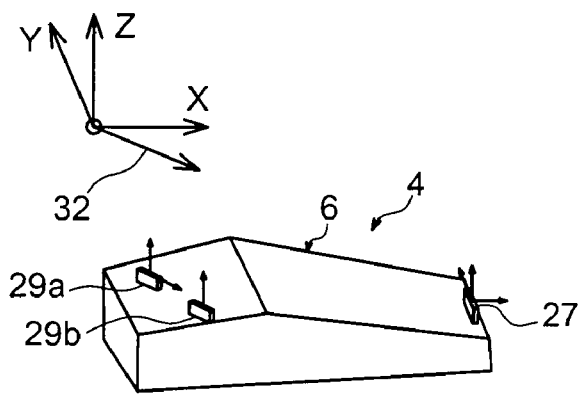
FIG. 9 shows a diagrammatic view symbolizing forces resisted by each of the attachments in the assembly in the form of the preferred embodiment shown in FIGS. 6 to 8.

Preferably, as can be seen in FIG. 6, the four pins 46, 56, 60 and 68 form a quadrilateral and preferably a square or a rectangle. Consequently, if any one of the first, second and third pins 56, 46, 60 called the active pins should break, it can be seen that the two remaining active pins cooperate with the <<Fail Safe>> pin 68 to form a new assembly also capable of resisting triangular forces in the plane P, and quite suitable for resisting forces applied along the Z direction and direction 32.

Once again with reference to FIG. 6, it can be seen that the design of the other forward half-attachment, in other words the half-attachment 29b located furthest from the fuselage, is practically the same as what was described above with reference to FIGS. 6 to 9. The only difference lies in the fact that the third pin 60 is mounted in the same way as the fourth pin 68, namely with radial clearance preventing it from carrying forces under normal conditions, but capable of forming a new force path in case the pin 56 should break. In this half-attachment 29b designed only to resist forces along the Z direction, these forces normally pass through the first and second pins 56, 46 that are the only active pins. If the first should break, then the third pin 60 becomes active to make the junction between the shackle 38 and the forward spar 34 of the wing 2, and if the second pin should break then the fourth pin 68 become active to form the junction between the shackle 38 and the upper spar 20 of the rigid structure 6.

Figure 10:
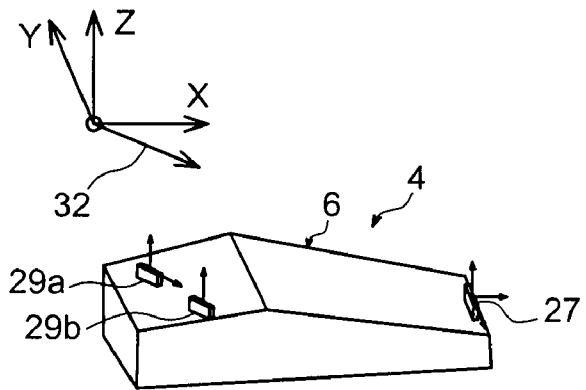
FIG. 10 shows a diagrammatic view symbolically representing forces resisted by each attachment in the assembly in the form of an alternative to the preferred embodiment shown in FIGS. 6 to 8.

The only modification in one alternative to the preferred embodiment shown in FIGS. 6 to 9 is that the aft attachment 27 is designed to resist forces along the X, 32 and Z directions, and no longer the X, Y and Z directions as shown diagrammatically in FIG. 10. In this statically determinate system integrating the aft attachment 27, forces applied along the X direction are resisted by the aft attachment 27, forces applied along the width direction 32 are resisted jointly by the half-attachment 29a and the aft attachment 27, and forces applied along the Z direction are resisted jointly by means of the two half-attachments 29a, 29b and the aft attachment 27. Also, the moment applied about the X direction is resisted vertically by means of two forward half-attachments 29a, 29b, the moment applied about the width direction 32 is resisted vertically by means of the two half-attachments 29a, 29b and the aft attachment 27, and the moment applied about the Z direction is resisted jointly using the forward half-attachment 29a and the aft attachment 27.

Obviously, various modifications can be made by those skilled in the art to the assemblies 1 for an aircraft that have just been described, solely as non-limitative examples. In particular, the assembly could integrate two forward half-attachments with a design exactly the same as or similar to the design of the forward half-attachment 29b shown in FIG. 6 and described above.

The invention claimed is:

1. An assembly for an aircraft comprising:
a wing element having a forward spar oriented parallel to a leading edge of the wing element along a wing spar direction;
a suspension pylon for an engine under the wing element, wherein said wing spar direction is oriented in an X-Y plane and inclined in X and Y directions, wherein the X direction is the longitudinal direction of the suspension pylon and is parallel to a longitudinal axis of the engine and the Y direction is transverse to the suspension pylon and to the longitudinal axis of the engine, a Z direction being a vertical direction, and the X, Y and Z directions being orthogonal to each other;
an attachment structure for attaching a rigid structure of the pylon onto the wing element, said attachment structure including two forward half-attachments,
wherein each of said two forward half-attachments includes a shackle and is configured to resist forces applied along the vertical direction of the suspension pylon,
wherein each shackle is mounted firstly articulated through a first pin onto a first fitting fixed to the forward spar,
wherein the shackles have axes parallel to each other and parallel to the wing spar direction of the wing element,
wherein each shackle is secondly mounted articulated through a second pin onto a second fitting fixed to the rigid structure, and
wherein a same plane contains the axes of the two shackles of the forward half-attachments and said same plane does not intersect the wing spar direction.

2. An assembly for an aircraft according to claim 1, wherein the plane does not intersect the vertical direction of the suspension pylon.

3. An assembly for an aircraft according to claim 1, wherein the second fitting of each forward half-attachment is a double-head fitting and the shackle is arranged between the two heads.

4. An assembly for an aircraft according to claim 1, wherein for each forward half-attachment, the first pin also passes through another fitting rigidly added onto the wing element, such that the shackle is located between the first fitting and the other fitting.

5. An assembly for an aircraft according to claim 1, wherein one of the two forward half-attachments is configured such that its shackle is mounted to be articulated through a third pin, onto the first fitting fixed to the forward spar, so that the forward half-attachment is capable of resisting forces applied along the wing spar direction.

6. An assembly for an aircraft according to claim 5, wherein the first, second, and third pins are oriented to be orthogonal to the plane.

7. An assembly for an aircraft according to claim 1, wherein the attachment structure further includes an aft attachment configured to resist forces applied along a longitudinal direction of the pylon, along a transverse direction of the pylon, and along the vertical direction.

8. An assembly for an aircraft according claim 7, wherein the attachment structure forms a statically determinate mounting system composed exclusively of the two forward half-attachments and the aft attachment.

9. An assembly for an aircraft according to claim 1, wherein the attachment structure further includes an aft attachment configured to resist forces applied along a longitudinal direction of the pylon, along the wing spar direction, and along the vertical direction.

10. An aircraft comprising at least one assembly according to claim 1.

11. An assembly for an aircraft according to claim 1, wherein the shackles have identical designs.

12. An assembly for an aircraft according to claim 1, wherein the shackles have a same length.

13. An assembly for an aircraft according to claim 1, wherein the second fittings extend parallel to the wing spar direction in a same plane.

* * * * *